(12) United States Patent
Antonov et al.

(10) Patent No.: US 9,501,742 B2
(45) Date of Patent: Nov. 22, 2016

(54) SYSTEM AND METHOD FOR ASSESSING CATEGORIZATION RULE SELECTIVITY

(71) Applicant: Kaspersky Lab ZAO, Moscow (RU)

(72) Inventors: Alexey E. Antonov, Smolensk (RU); Alexey M. Romanenko, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 6 days.

(21) Appl. No.: 14/496,848

(22) Filed: Sep. 25, 2014

(65) Prior Publication Data

US 2015/0161523 A1   Jun. 11, 2015

(30) Foreign Application Priority Data

Dec. 5, 2013 (RU) .................. 2013153768

(51) Int. Cl.
  *G06F 15/18* (2006.01)
  *G06N 5/02* (2006.01)
  *G06F 17/30* (2006.01)

(52) U.S. Cl.
  CPC ......... *G06N 5/025* (2013.01); *G06F 17/30598* (2013.01)

(58) Field of Classification Search
  None
  See application file for complete search history.

(56) References Cited

U.S. PATENT DOCUMENTS

| | | | |
|---|---|---|---|
| 7,979,907 B2 | 7/2011 | Schultz et al. | |
| 8,239,948 B1* | 8/2012 | Griffin et al. | 726/24 |
| 8,356,354 B2 | 1/2013 | Nazarov | |
| 8,566,351 B2 | 10/2013 | Iwayama | |
| 2008/0114710 A1 | 5/2008 | Pucher | |
| 2011/0055123 A1* | 3/2011 | Kennedy | 706/12 |
| 2012/0167219 A1 | 6/2012 | Zaitsev et al. | |
| 2012/0317644 A1* | 12/2012 | Kumar et al. | 726/24 |
| 2013/0133069 A1 | 5/2013 | Nazarov | |

FOREIGN PATENT DOCUMENTS

| | | |
|---|---|---|
| RU | 2477520 | 3/2013 |
| RU | 2480937 | 4/2013 |

OTHER PUBLICATIONS

Russian Search Report for Russian Application No. 2013153768/08(084049) dated Dec. 5, 2013. English translation not available.
Fürnkranz et al., "An Analysis of Rule Evaluation Metrics", 8 pages (1999).
Yao et al., "Micro and Macro Evaluation of Classification Rules", 7 pages. (2008).

(Continued)

*Primary Examiner* — Kakali Chaki
*Assistant Examiner* — Kevin W Figueroa
(74) *Attorney, Agent, or Firm* — Patterson Thuente Pedersen P.A.

(57) ABSTRACT

Assessment of selectivity of categorization rules. One or more categorization rules are applied to a set of un-categorized objects to produce a categorization result set representing assignment of objects the set into at least two categories. A selectivity score for the at least one categorization rule is obtained based on statistical information. The numerical selectivity score represents an estimation of accuracy of the at least one categorization rule, and is produced as a result of application of at least one trained selectivity determination algorithm, which is based on application of a plurality of specially-selected categorization rules to a set of pre-categorized training data, with the application of each one producing a uniform grouping of objects.

22 Claims, 5 Drawing Sheets

(56) References Cited

OTHER PUBLICATIONS

Yang, "An Evaluation of Statistical Approaches to Text Categorization", School of Computer Science. Apr. 10, 1997.

Apté, "Automated Learning of Decision Rules for Text Categorization", Jul. 1994.

Dietterich, "Approximate Statistical Tests for Comparing Supervised Classification Learning Algorithms", Department of Computer Science. Dec. 30, 1997.

Ye et al., "CIMDS: Adapting Postprocessing Techniques of Associative Classification for Malware Detection", IEEE Transaction on Systems, Man and Cybernetics. vol. 40, No. 3. May 2010.

Alazab et al., "Zero-day Malware Detection based on Supervised Learning Algorithms of API call Signatures", Proceedings of the $9^{th}$ Australasian Data Mining Conference. Ballarat, Australia. 11 pages. vol. 121 (2011).

Menahem et al., "Improving Malware Detection by Applying Multi-Inducer Ensemble". Israel. (2008).

Damopoulos et al., "Evaluation of Anomaly-Based IDS for Mobile Devices Using Machine Learning Classifiers", Security and Communication Networks. (2011).

* cited by examiner

SYSTEM AND METHOD FOR ASSESSING CATEGORIZATION RULE SELECTIVITY

CLAIM TO PRIORITY

This Application claims priority to Russian Federation Patent Application No. 2013153768 filed Dec. 5, 2013, the content of which is incorporated by reference herein.

FIELD OF THE INVENTION

This invention relates to the field of information security and, more particularly, to monitoring or scanning of software or data including protection against computer threats using categorization of objects.

BACKGROUND OF THE INVENTION

Personal computers and similar information technology devices, such as mobile phones, tablets, and the like, have become ubiquitous throughout the world. Unfortunately, with the increasingly widespread usage of such technology, there is a corresponding increase in the number, and quality, of computer threats, such as malware. Computer threats in the present context refer generally to objects able to cause any harm to the information and programs on a computer system, such as network worms, spyware, computer viruses, and the like.

Various antivirus technologies are deployed to protect users and their personal computers from possible computer threats. Antivirus software can include various computer threat detection components. Signature-based detection and heuristic detection engines represent particular cases of such components. Due to the significant growth of the number of malicious programs, the efficiency of the above-mentioned protective technologies depends on the number of signatures and heuristic rules that are available for their use. At present, new heuristic rules and signatures are created by experts and by automated signature creation systems designed for such purposes. Extensive work of experts and automated systems results in the creation of a large number of heuristic rules and signatures for detection of computer threats. The large number of created heuristic rules and signatures (hereinafter referred to simply as "detection rules") often increases the number of false activations during the operation of threat detection systems.

There are systems which examine detection rules based on a check of specified rules using a collection of safe files. When such systems are used, a detection rule is checked using a collection of safe files and is made available to the user's antivirus software only after an update of antivirus databases.

However, a representative collection of safe files made available to antivirus software manufacturers cannot cover the entire variety of files encountered by users in the field; therefore, quite often, feedback from the detection rule is used when it is already functioning on the user side. An antivirus application using a detection rule can send notices to developers, specifying which files activated the rule, and the developers analyze this information on their side. However, this scenario presents a burden to the developers and suffers from associated inefficiencies and the potential for human errors.

A solution is needed that facilitates automated deployment of highly selective detection rules (which, when used, will not cause false activations).

SUMMARY OF THE INVENTION

One aspect of the invention is directed to a system for assessing the selectivity of categorization rules. The system includes a computer including at least one processor, a non-transitory data storage medium interfaced with the at least one processor, and input/output facilities. The data storage medium contains instructions that, when executed by the at least one processor, implement a categorization rule application engine, a selectivity determination engine, and an algorithm training engine.

The categorization rule application engine is configured to apply at least one categorization rule to a set of un-categorized objects to produce a categorization result set representing assignment of objects the set into at least two categories, and to gather statistical information relating to the categorization result set based on properties of objects assigned to each of the at least two categories. The selectivity determination engine is configured to assess a numerical selectivity score for the at least one categorization rule based on the statistical information, the numerical selectivity score representing an estimation of accuracy of the at least one categorization rule. The selectivity determination engine applies at least one trained selectivity determination algorithm to produce the selectivity score. The algorithm training engine is configured to produce the at least one trained selectivity determination algorithm based on application of a plurality of specially-selected categorization rules to a set of pre-categorized training data. The application of each one of the specially-selected categorization rules to the set of training data produces at least one uniform grouping of objects in which the objects all meet a predefined similarity criterion.

Related aspects of the invention are directed to a method for assessing the selectivity of categorization rules, based on automatically operating a specialized system, such as the one described above.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the invention are directed to the use of categorization rules. In the present disclosure, for the sake of brevity, the example embodiments are focused on applying the categorization rules to files as part of anti-malware and related computer security applications. However, persons skilled in the relevant computing arts will recognize that the use of categorization rules is applicable in numerous other areas within the broader computing field including, but not limited to, machine vision (i.e., optical pattern recognition), speech-to-text applications, context-aware searching algorithms, among others. In addition, it will be readily apparent that other types of objects, not only files, can be categorized using categorization rules. An object in the present context includes files, as well as other data structures, stored in a computer system's storage device.

Aspects of the present invention can be implemented as part of a computer system. The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

The system includes various engines, each of which is constructed, programmed, configured, or otherwise adapted, to carry out a function or set of functions. The term engine as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. A engine can also be implemented as a combination of the two, with certain functions facilitated by hardware alone, and other functions facilitated by a combination of hardware and software. In certain implementations, at least a portion, and in some cases, all, of a engine can be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of suitable configurations, and should generally not be limited to any particular implementation exemplified herein, unless such limitations are expressly called out. In addition, a engine can itself be composed of more than one sub-engines, each of which can be regarded as a engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Figure 1:
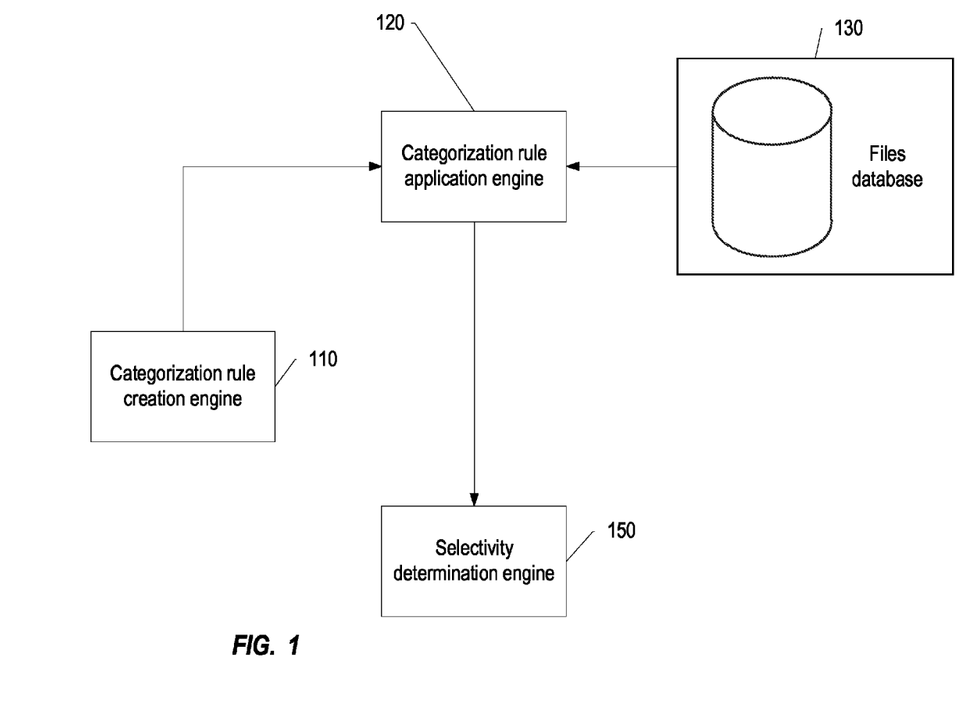
FIG. 1 is a structural diagram illustrating a system for determining the selectivity of a categorization rule according to one embodiment of the invention.

FIG. 1 is a structural diagram illustrating a system for determining the selectivity of a categorization rule according to one embodiment. In the present context, a categorization rule is a rule that, when applied to an object (e.g., a file), allows the system to determine whether the file belongs to one of the file categories defined by the rule. Categorization rules can also be applicable to file processing results—for example, to the results of the emulation of the file's execution process, or to the results of the calculation of the file's message digest (e.g., hash). An example of a categorization rule can be a rule for detecting malicious software, which determines whether the file belongs to a certain category of malicious software files—a rule dividing a set of files to which the file is applied into, for example, files belonging to the category of Trojan.Win32 malicious software, and files not belonging to that category—or a file's message digest which determines whether the file belongs to a file category with a matching message digest value.

The categorization rule creation engine 110 is programmed, or otherwise configured, to create categorization rules. In one embodiment, categorization rule creation engine 110 uses data of one file to create a categorization rule. In another embodiment, a cluster of similar files is used during the creation of a categorization rule. In turn, files are considered to be similar if the degree of similarity between them exceeds a preset threshold.

In one embodiment, the degree of similarity between files is determined based on a computed degree of similarity between the data stored in the files. In another embodiment, the degree of similarity between the files is determined based on the degree of similarity between the files' respective functionality. In one embodiment, a log of calls for API functions of the operating system during file execution emulation is used as a definition of a file's functionality. In a related embodiment, the degree of similarity is determined using Dice's distance; in another embodiment, the degree of similarity is determined using one of the following distances: Hamming, Levenstein, Jaccard, and other applicable measures.

In one embodiment, the categorization rule creation engine 110 is further configured to create signatures for detecting malicious software using a cluster of malicious files. For each cluster of similar malicious files, the categorization rule creation engine 110 separates data segments common for the files from the cluster and creates a signature for detection as a concatenation of common byte blocks with an indication of the offset of each block in relation to the beginning of the file. After the creation of the categorization rule, the categorization rule creation engine 110 passes the created file detection signature to the input of categorization rule application engine 120.

The categorization rule application engine 120 applies the categorization rule to a set of input files. The set of input files are generally un-categorized at this stage, meaning that their categorization has not been determined a priori. In one example, the set of input files is stored in the file database 130. In another example, the input files are distributed throughout a file system of a local computer system. In still another example, the set of input files is distributed over one or more distinct computer systems interconnected over a computer network.

The application of the categorization rule causes the system to assign each of the input files into categories, as defined in the categorization rule (for example, into (a) files belonging to the category of Trojan.Win32 (malicious software), and (b) files not belonging to that category). The operation of categorization rule application engine 120 generates a categorization result set that includes assignment of each of the files into each of the two or more categories.

In addition, the categorization rule application engine 120 is configured to gather the statistics of the categorization rule's use. The statistics of a categorization rule's use represent information on the set of files belonging to each of the categories defined in the above-mentioned categorization rule. Accordingly, in one such embodiment, the categorization rule application engine 120 uses a set of input files to obtain statistics of the use of the categorization rule.

From each set of files falling into the rule's defined categories, the categorization rule application engine 120 gathers a set of properties relating to operation of the categorization application engine and each of the categorized files. In one embodiment, such properties include:
  the time elapsed from the moment of the first application of the categorization rule;
  the number of files that the categorization rule assigned into one of the categories defined in the rule;
  the average, minimum and maximum values of the sizes of the files that the categorization rule assigned into one of the categories defined in the rule;
  the number of unique compilers used to create each of the categorized files;
  the number of unique packagers used in the files. In this case, packaging of an executable file means compression of the file with the addition of a sequence of unpacking instructions to the body of the file.

The categorization rule application engine 120 collects statistics of the use of the categorization rule based on the properties gathered for each of the file categories into which the set of files from the files database 130 is divided when the categorization rule is applied. In one embodiment, the statistics of the use of the categorization rule can contain one or more attributes derived from the set of the above-described parameters. The categorization rule application engine 120 passes the categorization rule use statistics obtained in the above-described manner to the input of the selectivity determination engine 150.

Figure 2:
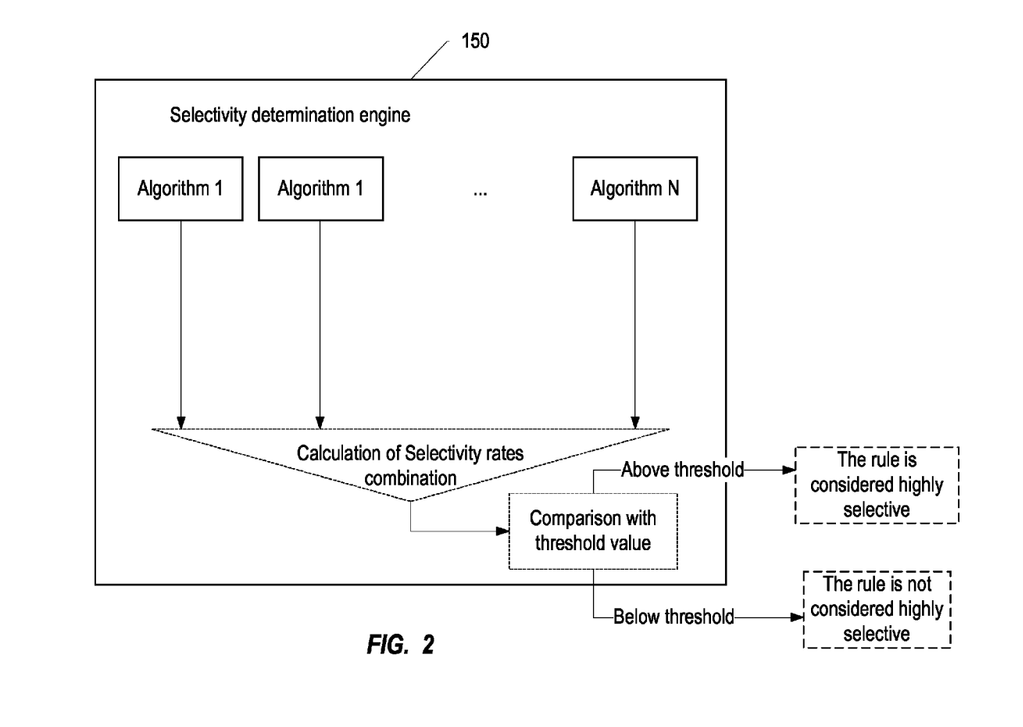
FIG. 2 is a diagram illustrating an exemplary structure of a selectivity determination engine depicted in FIG. 1 according to one embodiment.

The selectivity determination engine 150 is programmed, or otherwise configured, to assess whether the categorization rule is highly selective. An exemplary structure of selectivity determination engine 150 is depicted in FIG. 2 according to one embodiment. In one embodiment, operation of the selectivity determination engine 150 is step-wise, using two steps. In the first step, the selectivity determination engine 150 determines categorization rule selectivity scores. The selectivity score is a numerical value; in one embodiment, it is a real number, for instance, 1.4. To determine the selectivity score, at least one trained data analysis algorithm is used. The purpose of the use of a trained data analysis algorithm is to calculate the categorization rule's selectivity score using the set of data representing the statistics of the use of the categorization rule as collected by the categorization rule application engine 120.

In one embodiment, in order to determine the selectivity score, a decision tree is used as the trained data analysis algorithm. Accordingly, this algorithm assigns a selectivity score, as a numerical value, to the categorization rule based on the statistics of use. Each categorization rule to which a decision tree is applied in order to determine the selectivity score is assigned a numerical selectivity score. Each node of the tree is assigned an analyzed parameter of statistics of use, for example, "number of compilers used for creation of files assigned to one of the file categories in accordance with the categorization rule". Such node is connected with the next nodes, corresponding to other parameters, with boundaries corresponding to one of the possible ratings of the use statistics parameter. A transition on each of the boundaries (in accordance with the application of the decision tree algorithm to the categorization rule use statistics) is accompanied by a change of the selectivity score.

Next, the decision tree is applied to assess the complete list of parameters from the categorization rule use statistics. The option of using the decision tree when determining the selectivity score can be further illustrated by the following example. Let us assume that, in gathering categorization rule use statistics, the following statistics parameters are taken into account:
  the elapsed time from the moment of the first application of the categorization rule (parameter 1);
  the relation of the maximum and minimum value to the average value of the size of the files assigned by the categorization rule into each of the categories defined in the rule (parameter 2 and parameter 3 for each category);
  the number of unique compilers used to create the input files (parameter 4);
  the number of unique packagers used in the files (parameter 5).

Assume further that an analysis objective is to analyze a rule that, when applied to a set of files, divides the set into three categories: category A, category B, and category C, where, for example, in accordance with the categorization rule logic, all input files from the above-described set that were not assigned into category A and B are assigned by default into category C. Let us assume that the following statistics of the use of the above rule were received:
  parameter 1—10 hours;
  parameter $2_A$ (parameter 2 for category A)—1.2;
  parameter $2_B$ (parameter 2 for category B)—1.7;
  parameter $2_C$ (parameter 2 for category C)—5;
  parameter $3_A$ (parameter 3 for category A)—0.9;
  parameter $3_B$ (parameter 3 for category B)—0.8;
  parameter $3_C$ (parameter 3 for category C)—0.5;
  parameter 4—1;
  parameter 5—2.

Let us assume that, initially, each assessed categorization rule is assigned a selectivity score equal to the number 10. Also, assume that the pattern of the decision tree used to determine the selectivity score appears as follows:
  if parameter 1 is less than 24 hours, deduct the number 2 from the selectivity score, otherwise add 1;
  if parameter $2_A$ is more than 1.3, deduct the number 1.5 from the selectivity score, otherwise add 1.2;
  if parameter $2_B$ is more than 1.3, deduct the number 1.5 from the selectivity score, otherwise add 1.2;
  if parameter $2_C$ is more than 20, deduct the number 0.01 from the selectivity score, otherwise add 0.01;
  if parameter $3_A$ is less than 0.8, deduct the number 2 from the selectivity score, otherwise add 1.1;
  if parameter $3_B$ is less than 0.8, deduct the number 2 from the selectivity score, otherwise add 1.1;
  if parameter $3_C$ is less than 0.3, deduct the number 0.005 from the selectivity score, otherwise add 0.002;
  if parameter 4 is more than 1, deduct the number 5 from the selectivity score, otherwise add 2;
  if parameter 5 is less than 3, deduct the number 0.5 from the selectivity score, otherwise add 0.3.

In accordance with the above-described conditions, after the application of the decision tree, the selectivity score of the analyzed categorization rule will be equal to 11.412.

Situations are possible where it is needed to assess categorization rules which divide a set of files into a different number of categories. In one embodiment, in order to apply the same decision tree for assessing such categorization rules, it is possible to group the categories of rules in order to apply identical selectivity score assessments and changes to them, and to additionally isolate a separate category for assessment—it will include the files which, based on the application of the rule, were not put into any of the previously grouped categories.

In another embodiment, in addition to the above-mentioned decision tree, the selectivity determination engine 150 calculates one more categorization rule selectivity score using regressive analysis. In yet another embodiment, in addition to the above-mentioned trained data analysis algorithms, the selectivity determination engine 150 calculates an additional selectivity score of the categorization rule using a naïve Bayes classifier. In one embodiment, additional selectivity scores are calculated by the selectivity determination engine 150 in order to increase the accuracy of the determination of the categorization rule's selectivity. Each selectivity score of the categorization rule, calculated using one, or a combination of, the utilized trained data analysis algorithms by the selectivity determination engine 150 based on the statistics of the use of the categorization rule, is used by the above-mentioned engine at the second operation step.

At the second step in the operation of the selectivity determination engine 150, a combination of selectivity scores is computed and compared with a predefined threshold value. In one embodiment, the mean value of selectivity scores of the various algorithms is calculated as a combined selectivity score. In another embodiment, the mean-square value of selectivity scores is calculated as selectivity score combination. If the combination of the categorization rule's selectivity scores exceeds the threshold value, the selectivity determination engine 150 considers the categorization rule as highly selective; in the opposite case, the selectivity determination engine 150 considers the categorization rule as not highly selective.

Let us assume, for example, that, using multiple trained data analysis algorithms, the following selectivity scores were obtained: 10.5, 11, 15, 17.3. And the mean value of selectivity scores is used to calculate the rates combination. In this case, the selectivity scores combination will have the value of 13.45. If, in order to consider a categorization rule as highly selective, a threshold value is established for the selectivity scores combination, for example, the number 12, the selectivity determination engine 150 will consider the assessed rule as highly selective.

Figure 3:
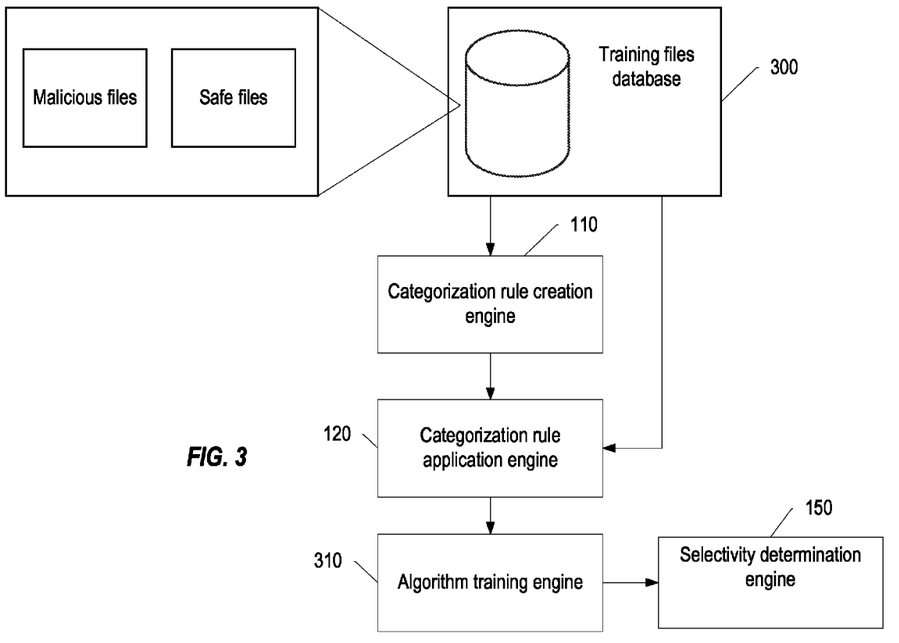
FIG. 3 is a diagram illustrating a related system for training data analysis algorithms used by a selectivity determination engine depicted in FIGS. 1 and 2 according to one embodiment.

FIG. 3 is a diagram illustrating training of the data analysis algorithms used by the selectivity determination engine 150. For the training of algorithms used by selectivity determination engine 150, a training files database 300 is used, which, in one embodiment, contains both malicious and safe training files. These training files are used by the categorization rule creation engine 110 to create a categorization rule. The categorization rule created by the categorization rule creation engine 110 (which, in one embodiment, is a signature for detecting malicious software) is sent to the input of the categorization rule application engine 120. The categorization rule application engine 120 uses files from the teaching files database 300 to obtain statistics of the use of the categorization rule created using the categorization rule creation engine 110. For the training of the data analysis algorithms, statistics of the use of multiple categorization rules are used. Statistics of the use of each categorization rule are gathered by the categorization rule application engine 120 and are passed to the input of the algorithm training engine 310.

The algorithm training engine 310 is programmed, or otherwise configured, to train, or adapt, the data analysis algorithms used by the selectivity determination engine 150. For the training of the data analysis algorithms by the algorithm training engine 310, a machine learning technique is used. In one embodiment, the algorithm training engine 310 uses statistics of the use of multiple different categorization rules to form a decision tree, which is used by the selectivity determination engine 150. In another embodiment, the operation of the algorithm training engine 310 results in the training of the algorithm of regressive analysis and Bayes classifier. The results of the training of algorithms, updated algorithms, are sent by the algorithm training engine 310 to the input of the selectivity determination engine 150. The updated algorithms are used by the selectivity determination engine 150 to determine the selectivity of the categorization rule using each of the trained data analysis algorithms.

In one embodiment, in order to improve the quality of the training of data analysis algorithms, and, consequently, of the determination of the selectivity of categorization rules, a selection criterion is applied to each analyzed categorization rule: at least one category of files, into which a set of files is grouped by the use of the categorization rule, is a uniform set of files. In this context, a set of files is uniform if it contains only similar files (similarity as defined above). Applying the selection criterion, specialized filtration of categorization rules is achieved as part of the training of the data analysis algorithms. In accordance with the specialized filtration, in order to obtain statistics of the use of categorization rules, only those categorization rules are used that, when applied to a set of files from the training files database 300, divide the set into file categories (as defined per the rule) in such a way that at least one file category is a uniform set of files.

Figure 4:
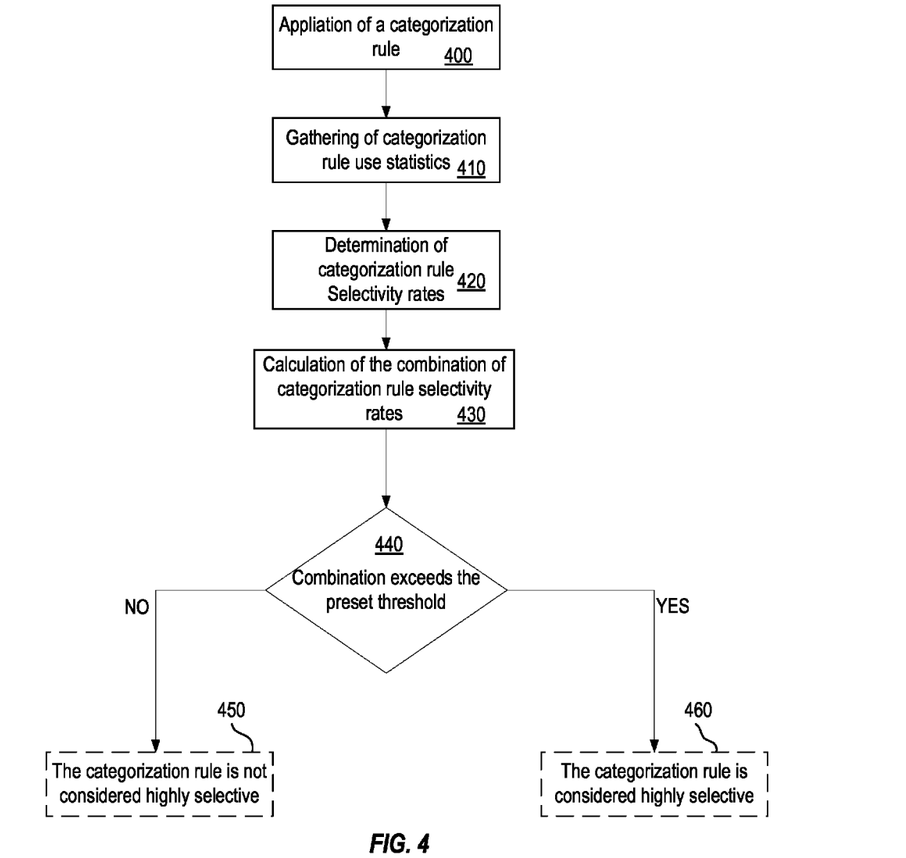
FIG. 4 is a flow diagram illustrating an exemplary operational algorithm that the system depicted in FIG. 1 is configured to execute, according to one embodiment.

FIG. 4 is a flow diagram illustrating an exemplary operational algorithm of one of the embodiments of the above-described system for assessing whether a categorization rule is highly selective. At 400, the categorization rule application engine 120 applies a created categorization rule. The categorization rule application engine 120, using the rule received from the categorization rule creation engine 110, applies the categorization rule to a set of un-categorized files from the files database 130. At 410, categorization rule application engine 120 collects statistics of the use of the categorization rule. The statistics of the use of the categorization rule collected at 410 are sent to the input of the selectivity determination engine 150. The selectivity determination engine, using at least one trained data analysis algorithm, calculates the selectivity score of the categorization rule at 420. The selectivity determination engine 150 calculates, at stage 430, the combination of the selectivity scores of the categorization rule obtained at 420. The selectivity scores combination obtained at 430 is compared with the preset threshold value in accordance with decision 440, using the selectivity determination engine 150. If the selectivity scores combination does not exceed the preset threshold value, the selectivity determination engine 150 will not consider the categorization rule as highly selective in as indicated at result 450. If the preset threshold value is exceeded, the selectivity determination engine 150 will consider the categorization rule as highly selective as indicated by result 460. Based on results 450 and 460, a further decision can be made as to the veracity of the categorization rule, i.e., how much weight can be given to the application of the rule.

By way of example, in one embodiment, in response to a categorization rule being deemed highly selective (result 460), the rule can be used as a definitive determination as to a presence of malware. On the other hand, in response to the categorization rule being deemed not highly selective (result 450), the rule can be used as a threshold test prompting additional analysis, such as heuristic analysis, to determine any presence of malware.

Notably, in one embodiment, the at least one trained data analysis algorithm has been trained with separately-verified uniform training data based on a filtered set of one or more categorization rules that produces only uniform categorizations.

Figure 5:
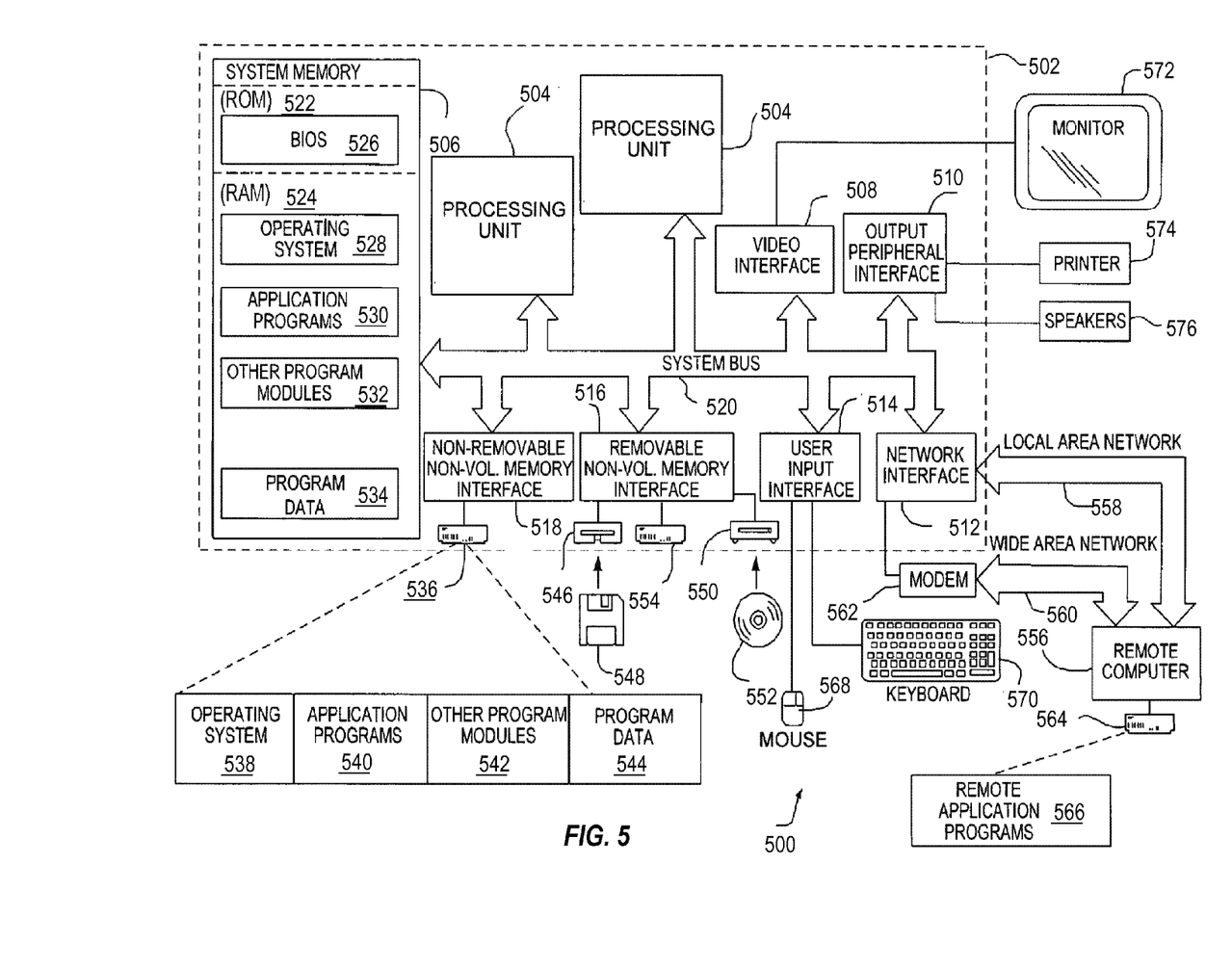
FIG. 5 is a diagram illustrating a computer system 500 on which aspects of the invention as described herein may be implemented according to various embodiments.

FIG. 5 is a diagram illustrating in greater detail a computer system 500 on which aspects of the invention as described herein may be implemented according to various embodiments. The computer system 500 may include a computing device such as a personal computer 502. The personal computer 502 includes one or more processing units 504, a system memory 506, a video interface 508, an output peripheral interface 510, a network interface 512, a user input interface 514, removable 516 and non-removable 518 memory interfaces and a system bus or high-speed communications channel 520 coupling the various components. In various embodiments, the processing units 504 may have multiple logical cores that are able to process information stored on computer readable media such as the system memory 506 or memory attached to the removable 516 and non-removable 518 memory interfaces 518. The computer 502 system memory 506 may include non-volatile memory such as Read Only Memory (ROM) 522 or volatile memory such as Random Access Memory (RAM) 524. The ROM 522 may include a basic input/output system (BIOS) 526 to help communicate with the other portion of the computer 502. The RAM 524 may store portions of various software applications such as the operating system 528, application programs 530 and other program engines 532. Further, the RAM 524 may store other information such as program or application data 534. In various embodiments, the RAM 524 stores information that requires low-latencies and efficient access, such as programs and data being manipulated or operated on. In various embodiments RAM 524 comprises Double Data Rate (DDR) memory, Error Correcting memory (ECC) or other memory technologies with varying latencies and configurations such as RAMBUS or DDR2 and DDR3. In this way, in various embodiments, the system memory 506 may store the input data store, access credential data store, operating memory data store, instruction set data store, analysis result data store and the operating memory data store. Further, in various embodiments, the processing units 504 may be configured to execute instructions that limit access to the aforementioned data stores by requiring access credential before access to the information is granted.

The removable 516 and non-removable 518 memory interfaces may couple the computer 502 to disk drives 536 such as SSD or rotational disk drives. These disk drives 536 may provide further storage for various software applications such as the operating system 538, application programs 540 and other program engines 542. Further, the disk drives 536 may store other information such as program or application data 544. In various embodiments, the disk drives 536 store information that doesn't require the same low-latencies as in other storage mediums. Further, the operating system 538, application program 540 data, program engines 542 and program or application data 544 may be the same information as that stored in the RAM 524 in various embodiments mentioned above or it may be different data potentially derivative of the RAM 524 stored data.

Further, the removable non-volatile memory interface 516 may couple the computer 502 to magnetic portable disk drives 546 that utilize magnetic media such as the floppy disk 548, Iomega® Zip or Jazz, or optical disk drives 550 that utilize optical media 552 for storage of computer readable media such as Blu-Ray®, DVD-R/RW, CD-R/RW and other similar formats. Still other embodiments utilize SSD or rotational disks housed in portable enclosures 54 to increase the capacity of removable memory.

The computer 502 may utilize the network interface 512 to communicate with one or more remote computers 556 over a local area network (LAN) 558 or a wide area network (WAN) 560. The network interface 512 may utilize a Network Interface Card (NIC) or other interface such as a modem 562 to enable communication. The modem 562 may enable communication over telephone lines, coaxial, fiber optic, powerline, or wirelessly. The remote computer 556 may contain a similar hardware and software configuration or may have a memory 564 that contains remote application programs 566 that may provide additional computer readable instructions to the computer 502. In various embodiments, the remote computer memory 564 can be utilized to store information such as identified file information that may be later downloaded to local system memory 506. Further, in various embodiments the remote computer 556 may be an application server, an administrative server, client computers, or a network appliance.

A user may enter information to the computer 502 using input devices connected to the user input interface 514 such as a mouse 568 and keyboard 570. Additionally, the input device may be a trackpad, fingerprint scanner, joystick, barcode scanner, media scanner or the like. The video interface 508 may provide visual information to a display such as a monitor 572. The video interface 508 may be an embedded interface or it may be a discrete interface. Further, the computer may utilize a plurality of video interfaces 508, network interfaces 512 and removable 516 and non-removable 518 interfaces in order to increase the flexibility in operation of the computer 502. Further, various embodiments utilize several monitors 572 and several video interfaces 508 to vary the performance and capabilities of the computer 502. Other computer interfaces may be included in computer 502 such as the output peripheral interface 510. This interface may be coupled to a printer 574 or speakers 576 or other peripherals to provide additional functionality to the computer 502.

Various alternative configurations and implementations of the computer 502 are within the spirit of the invention. These variations may include, without limitation, additional interfaces coupled to the system bus 520 such as universal serial bus (USB), printer port, game port, PCI bus, PCI Express or integrations of the various components described above into chipset components such as the northbridge or southbridge. For example, in various embodiments, the processing unit 504 may include an embedded memory controller (not shown) to enable more efficient transfer of data from the system memory 506 than the system bus 520 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A system for assessing the selectivity of categorization rules, the system comprising:
   a computer system including at least one processor, a non-transitory data storage medium interfaced with the at least one processor, and input/output facilities, the data storage medium containing instructions that, when executed by the at least one processor, implement:
      a categorization rule application engine configured to apply at least one categorization rule to a set of un-categorized objects to produce a categorization result set representing assignment of objects of the set into at least two categories into which the objects of the set are divided when the categorization rule is applied, the categorization rule application engine further configured to gather statistical information relating to the categorization result set based on properties of objects assigned to each of the at least two categories, and including at least one rule-specific aggregating statistic characterizing the application of to the categorization rule to all of the objects and at least one categorization-specific statistic characterizing the objects of one of the at least two categories;
      a selectivity determination engine configured to
         assess a numerical selectivity score for the at least one categorization rule, the numerical selectivity score representing an estimation of selectivity accuracy of the at least one categorization rule to provide an evaluation of the at least one categorization rule, the numerical selectivity score being calculated by the application of at least one trained selectivity determination algorithm to the statistical information including the at least one rule-specific aggregating statistic representing information on the set of files belonging to each of the categories defined in the categorization rule, the application of the at least one trained selectivity determination algorithm to the statistical information including considering each of a plurality of parameters derived from the statistical information and in accordance with the at least one categorization rule,
         and compare the selectivity score against a pre-defined selectivity threshold, wherein a selectivity score that exceeds the selectivity threshold is deemed highly selective; and
      an algorithm training engine configured to produce each of the at least one trained selectivity determination algorithm based on application of a plurality of specially-selected categorization rules to a set of pre-categorized training data, wherein the application of each one of the specially-selected categorization rules to the set of training data produces at least one uniform grouping of objects in which the objects all meet a predefined similarity criterion, and wherein the trained selectivity determination algorithms are unrelated to the plurality of specially-selected categorization rules.

2. The system of claim 1, wherein the set of un-categorized objects consists of files.

3. The system of claim 1, wherein the categorization rules are malware detection rules.

4. The system of claim 1, further comprising:
   a categorization rule creation engine implemented by the instructions, and configured to autonomously create categorization rules.

5. The system of claim 1, wherein the predefined similarity criterion is based on similarity of content of objects.

6. The system of claim 1, wherein the predefined similarity criterion is based on similarity of functionality of objects.

7. The system of claim 1, wherein the un-categorized objects reside on the computer system.

8. The system of claim 1, wherein the properties of objects assigned to each of the at least two categories on which the categorization result set is based include at least one set of properties selected from the group consisting of: elapsed time since a prior application of a categorization rule, a quantity of objects categorized into a category by application of a categorization rule, a size of objects categorized into a category by application of a categorization rule, or any combination thereof.

9. The system of claim 1, wherein the properties of objects assigned to each of the at least two categories on which the categorization result set is based include at least one set of properties selected from the group consisting of: unique compilers used to create objects categorized into a category by application of a categorization rule, unique packagers used to create objects categorized into a category by application of a categorization rule, or any combination thereof.

10. The system of claim 1, wherein the selectivity determination engine is configured to apply a plurality of different trained selectivity determination algorithms to produce a corresponding plurality of individual selectivity scores, and wherein the selectivity determination engine is further configured to aggregate the plurality of individual selectivity scores to produce a single total selectivity score for each categorization rule.

11. A machine-implemented method for assessing the selectivity of categorization rules, the method comprising:

autonomously applying at least one categorization rule to a set of un-categorized objects to produce a categorization result set representing assignment of objects of the set into at least two categories into which the objects of the set are divided when the categorization rule is applied;

autonomously gathering statistical information relating to the categorization result set based on properties of objects assigned to each of the at least two categories, and including at least one rule-specific aggregating statistic characterizing the application of to the categorization rule to all of the objects and at least one categorization-specific statistic characterizing the objects of one of the at least two categories;

autonomously assessing a numerical selectivity score for the at least one categorization rule, the numerical selectivity score representing an estimation of selectivity accuracy of the at least one categorization rule to provide an evaluation of the at least one categorization rule, the numerical selectivity score being calculated by the application of at least one trained selectivity determination algorithm to the statistical information including the at least one rule-specific aggregating statistic representing information on the set of files belonging to each of the categories defined in the categorization rule, the application of the at least one trained selectivity determination algorithm to the statistical information including considering each of a plurality of parameters derived from the statistical information and in accordance with the at least one categorization rule;

autonomously producing each of the at least one trained selectivity determination algorithm based on application of a plurality of specially-selected categorization rules to a set of pre-categorized training data, wherein the application of each one of the specially-selected categorization rules to the set of training data produces at least one uniform grouping of objects in which the objects all meet a predefined similarity criterion, and wherein the trained selectivity determination algorithms are unrelated to the plurality of specially-selected categorization rules and comparing the selectivity score against a predefined selectivity threshold, wherein a selectivity score that exceeds the selectivity threshold is deemed highly selective.

12. The method of claim 11, wherein the set of un-categorized objects consists of files.

13. The method of claim 11, wherein the categorization rules are malware detection rules.

14. The method of claim 11, further comprising: autonomously creating the categorization rules.

15. The method of claim 11, wherein the predefined similarity criterion is based on similarity of content of objects.

16. The method of claim 11, wherein the predefined similarity criterion is based on similarity of functionality of objects.

17. The method of claim 11, wherein the properties of objects assigned to each of the at least two categories on which the categorization result set is based include at least one set of properties selected from the group consisting of: elapsed time since a prior application of a categorization rule, a quantity of objects categorized into a category by application of a categorization rule, a size of objects categorized into a category by application of a categorization rule, or any combination thereof.

18. The method of claim 11, wherein the properties of objects assigned to each of the at least two categories on which the categorization result set is based include at least one set of properties selected from the group consisting of: unique compilers used to create objects categorized into a category by application of a categorization rule, unique packagers used to create objects categorized into a category by application of a categorization rule, or any combination thereof.

19. The method of claim 11, wherein a plurality of different trained selectivity determination algorithms are applied to produce a corresponding plurality of individual selectivity scores, and wherein the plurality of individual selectivity scores are aggregated to produce a single total selectivity score for each categorization rule.

20. A system for assessing the selectivity of categorization rules, the method comprising:

means for applying at least one categorization rule to a set of un-categorized objects to produce a categorization result set representing assignment of objects of the set into at least two categories into which the objects of the set are divided when the categorization rule is applied and for gathering statistical information relating to the categorization result set based on properties of objects assigned to each of the at least two categories, and including at least one rule-specific aggregating statistic characterizing the application of to the categorization rule to all of the objects and at least one categorization-specific statistic characterizing the objects of one of the at least two categories;

means for assessing a numerical selectivity score for the at least one categorization rule, the numerical selectivity score representing an estimation of selectivity accuracy of the at least one categorization rule to provide an evaluation of the at least one categorization rule, the numerical selectivity score being calculated by the application of at least one trained selectivity determination algorithm to the statistical information including the at least one rule-specific aggregating statistic representing information on the set of files belonging to each of the categories defined in the categorization rule, the application of the at least one trained selectivity determination algorithm to the statistical information including considering each of a plurality of parameters derived from the statistical information and in accordance with the at least one categorization rule, and comparing the selectivity score against a predefined selectivity threshold, wherein a selectivity score that exceeds the selectivity threshold is deemed highly selective; and means for producing each of the at least one trained selectivity determination algorithm based on application of a plurality of specially-selected categorization rules to a set of pre-categorized training data, wherein the application of each one of the specially-selected categorization rules to the set of training data produces at least one uniform grouping of objects in which the objects all meet a predefined similarity criterion, and wherein the trained selectivity determination algorithms are unrelated to the plurality of specially-selected categorization rules.

21. The system of claim 1, wherein the trained selectivity determination algorithm uses a decision tree, and wherein each of the plurality of parameters is a node on the decision tree.

22. The method of claim 11, wherein the trained selectivity determination algorithm uses a decision tree, and wherein each of the plurality of parameters is a node on the decision tree.

* * * * *